April 20, 1926.
T. A. EDISON, JR
1,581,184
VACUUM FEED
Filed Jan. 5, 1923
2 Sheets-Sheet 2
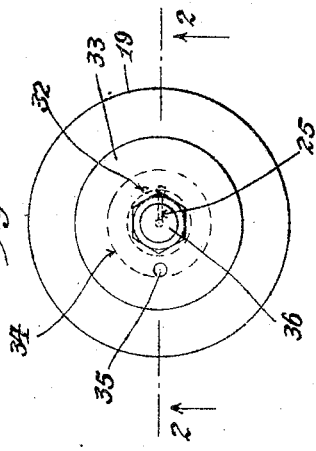
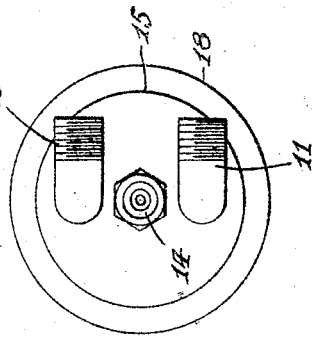
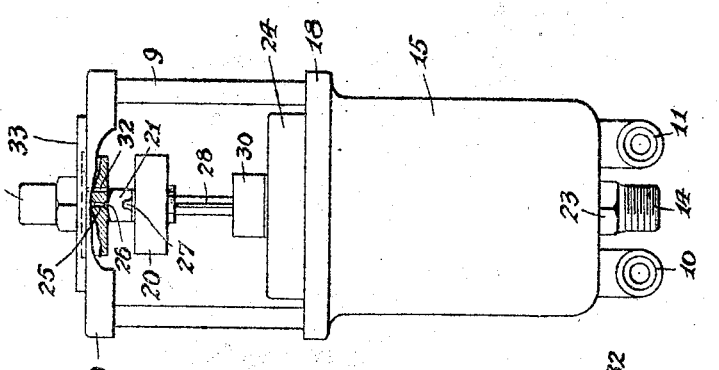
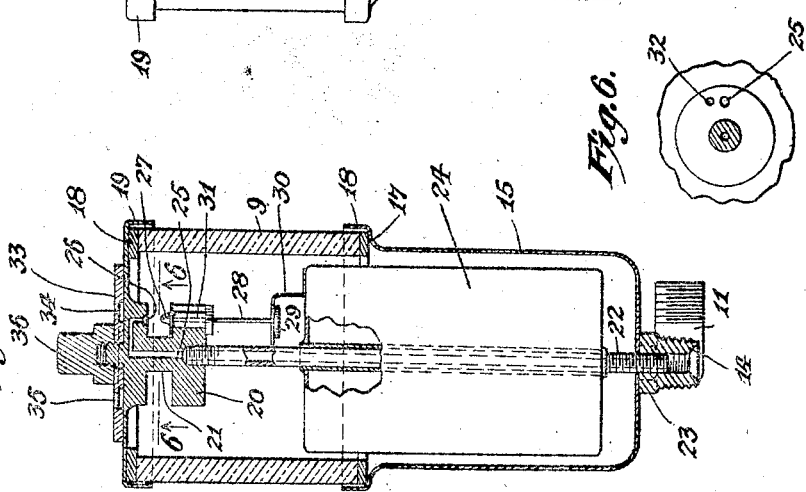
INVENTOR
Thomas A. Edison Jr
BY
Frank L. Dyer
ATTORNEY Patented Apr. 20, 1926.

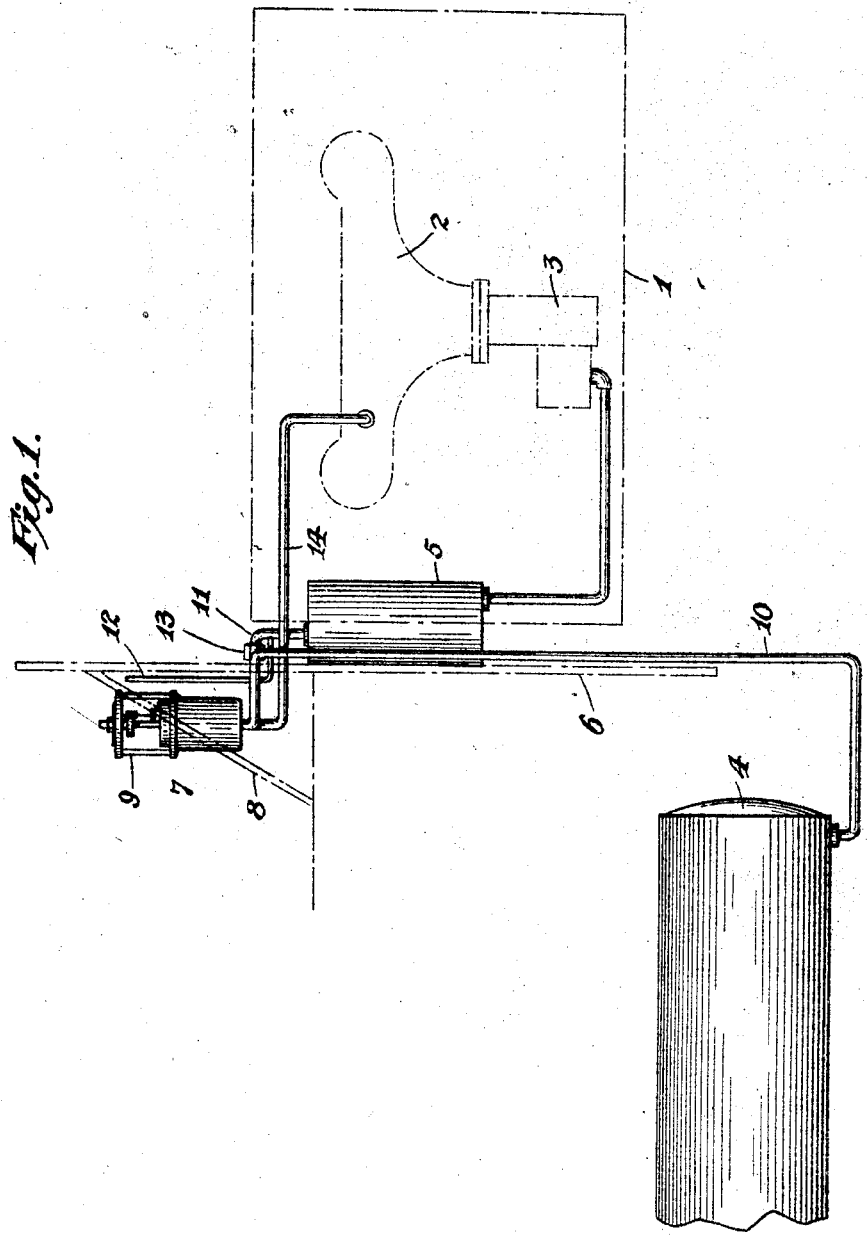

1,581,184

UNITED STATES PATENT OFFICE.

THOMAS A. EDISON, JR., OF ORANGE, NEW JERSEY.

VACUUM FEED.

Application filed January 5, 1923. Serial No. 610,838.

*To all whom it may concern:*

Be it known that I, THOMAS A. EDISON, Jr., a citizen of the United States, residing at Orange, in the county of Essex and State of New Jersey, have invented certain Improvements in Vacuum Feeds, of which the following is a full, clear, and exact description.

My invention relates to improvements in vacuum feeds which have been particularly designed for use in connection with automobiles.

The principal object of my invention is to provide an improved vacuum feed in which the pump thereof will be a small and attractive structure no larger than an oil-cup in size, mounted on the dash or instrument board of the automobile so as to be readily observable by the driver, who at all times will be able to see whether the apparatus is functioning properly. Such a vacuum pump will constitute an attractive addition to the usual indicating and safety instruments with which a car is usually equipped; the exposed body of the device is of glass whereby the operations may be always observed and will be a source of interest. The operator not only can tell whether the apparatus is functioning properly, but he can also determine whether gasolene is being pumped from the main supply tank and the device furthermore affords an indication when the supply in the main tank is becoming exhausted by the sucking of bubbles as will be described. When the exhaustion of the gasolene in the main tank is thus indicated, the operator can still travel a considerable distance on the reserve supply in the auxiliary tank and will thus usually be able to reach a supply station to permit the main tank to be refilled.

A further object of the invention is to provide a vacuum feed system in which the vacuum pump has all of its connections at the bottom, thus making the device simple and cheap to construct, as well as easy to assemble and take down and at the same time giving to the device a finished and attractive appearance especially when mounted on the instrument board of the automobile, since the only parts exposed to view will be the glass portion of the pump body and the metal top thereof.

A further object of the invention is to simplify the construction and improve the operation of the vacuum pump, making the same certain and positive in its action, requiring no adjustments and capable of easy repair.

A further object of the invention is to provide means whereby the danger of the air vent becoming stopped up will be avoided.

In carrying my invention into effect I make use of a small and simple vacuum pump mounted on a dash or instrument board of the automobile and having a float therein which rises and falls as the gasolene level changes therein. This float controls the operation of a vacuum valve for alternately cutting off or admitting the vacuum or reduced pressure to the interior of the chamber. At all times the pump chamber is in communication with the atmosphere through a small vent. A pipe leads from the main gasolene supply tank to the pump chamber and enters the latter at the bottom; a second pipe leads from the bottom of the pump chamber to the ordinary auxiliary tank which leads to the carburetor and which is provided with a vent in the usual way to permit gasolene to flow out of the same, this last mentioned pipe having a check valve therein permitting gasolene to flow from the pump chamber into the auxiliary tank but preventing reverse flow; and a third pipe connecting with the intake side of the engine or other source of reduced pressure and leading also to the bottom of the pump chamber and extending vertically through the same to the top of the pump chamber where the ports or vents and valve mechanism are located. The area of the suction pipe and of the suction opening into the pump chamber are considerably larger than the opening of the vent leading to the atmosphere whereby on the suction stroke, although some air would be drawn from the atmosphere into the pump chamber, yet there will be sufficient reduction of pressure therein as to cause the gasoline to flow from the main tank into the pump chamber, so as to carry the float upwards to the point where it cuts off the vacuum and permits atmospheric pressure to be restored in the pump chamber. Consequently the gasolene flows through the pump chamber back into the main tank and also into the auxiliary tank past the check valve. These operations of the vacuum pump are continuous and are substantially independent of the speed of the engine; the pump in fact is operating practically as an independent gasolene pump drawing gasolene from the main tank and permitting it to flow back into the main tank and also into the auxiliary tank. The speed of the pump is ordinarily such that it makes several strokes per minute, whereby the proportion of gasolene ordinarily flowing through the auxiliary tank will soon fill the same, and when this takes place most of the gasolene at each stroke will flow back into the main tank and only such an amount will flow into the auxiliary tank as represents that used by the carburetor in the meantime. By thus operating the vacuum pump at a relatively high speed its operations will be clearly observable by the driver who can immediately detect any failure to function properly. With devices having extremely slow movements such a vacuum pump of the usual type where the gasolene level very slowly rises and falls, there is nothing to attract the eye and such device might fail to function without receiving any notice from the driver, but where an element is used whose parts are moving with comparative rapidity any cessation of those parts immediately attracts attention.

In order that my invention may be better understood attention is directed to the accompanying drawings forming a part of this specification, and in which—

Fig. 1 is a more or less schematic or outline drawing of my improved feed system showing the dash, the instrument board and a part of the engine in dotted lines;

Fig. 2 is a vertical sectional view of the improved vacuum pump with a float in its lowermost position, the vacuum valve being opened;

Fig. 3, a front view taken 90° from the section of Fig. 2 partly in section;

Fig. 4, a plan view, the dotted line 2—2 representing the section on which Fig. 2 is taken;

Fig. 5, a bottom view of the pump; and

Fig. 6, a detail section on the line 6—6 of Fig. 2.

In all of the above views corresponding parts are represented by the same reference numerals.

Referring first to Fig. 1, the dotted rectangle 1 represents the general space enclosed by the hood and containing the engine. The only parts of the engine shown are in dotted lines and comprise the manifold 2 and the carburetor 3. As is well known a reduced pressure exists within the manifold 2. The main gasolene supply tank 4 is located at any desired point below the level of the carburetor and the auxiliary tank 5 is located at a level above the carburetor, being shown secured to the front of the dash 6 (dotted lines). The vacuum pump 7 is carried by the usual instrument board 8 (dotted lines) on which is placed the speedometer and voltmeter and other instruments so as to be readily observable by the driver.

The upper part of the pump comprises the glass portion 9 which extends above the instrument board 8, thus permitting the interior mechanism of the pump to be observed. Leading from the bottom of the vacuum pump 7 is a pipe 10 extending to the bottom of the main tank 4 and also leading from the bottom of the pump is a pipe 11, entering the auxiliary tank 5 and provided with a vent 12 permitting atmospheric pressure to be maintained within the auxiliary tank. This pipe 11 is provided with any suitable form of check valve 13 for permitting the gasolene to flow from the pump to the auxiliary tank and preventing reverse flow. A pipe 14 also leads from the bottom of the pump and connects with the manifold 2 or other source of reduced pressure.

The construction of the pump in detail is more clearly shown in Figs. 2 to 6 inclusive to which attention is now directed. It comprises a sheet metal lower portion 15 having a shouldered upper edge 16 for receiving a packing or gasket 17 on which is seated a tubular glass portion 9 before referred to. The glass 9 is provided at its upper edge with a packing or gasket 18 upon which rests the top plate 19 of the pump. This top plate is formed with an integral disk 20 and neck 21. A tube 22 is screwed into the disc 20 at its upper end and is engaged by a nipple 23 with which the suction pipe 14 connects. By securing the nipple 23 tightly in position all the parts will be clamped firmly together with liquid tight joints. The tube 22 also acts as a guide for the hollow metallic float 24 which rises and falls as the level of gasolene changes in the pump chamber comprising the metal section 15 and the glass section 9. A passage 25 is formed as a continuation of the tube 22 and ends in the seat 26 with which cooperates a vacuum valve 27. This vacuum valve is provided with a stem 28 having a disc 29 at its lower end adapted to be engaged by the top of the float 24 to move the valve upwards to cut off the vacuum. The float is also provided with a bracket 30 having a bifurcated end which straddles the rod 28 so that when the float moves downwards as the gasolene flows out of the pump chamber the bracket 30 will engage the disc 29 and pull the vacuum valve 27 away from its seat. The stem 28 reciprocates smoothly in a guide 31 seated within the disc 20. Extending through the wall of the top 19 is a vent 32 which at all times is in communication with the atmosphere. In order to prevent this vent from being clogged I employ a disc 33 having a channel 34 therein with an opening 35 whereby atmospheric air will freely communicate with the interior of the pump chamber through the opening 35, channel 34 and vent 32. The disc 33 is held in position by a nut 36. Should the vent 32 accidentally become clogged the nut 36 may be loosened and the disc 34 moved until the opening 35 is in line with said vent, whereupon the vent may be cleaned by a needle or other sharp implement, after which the disc 34 is moved so as to bring the opening 35 out of line with the vent. The area of the vent 32 is considerably less than that of the passage 25 so that although air may enter from the atmosphere when the pressure is reduced within the pump chamber the amount of air thus admitted will not be enough to replace that removed through the passage 25 and in consequence on the suction stroke there will be a reduction of pressure within the pump chamber causing gasolene to flow from the main tank 4 into the pump chamber.

In operation, assuming the parts to be in position shown in Figs. 2 and 3, the action of the engine will result in a reduction of pressure within the pump chamber, and gasolene from the main tank 4 will therefore enter the chamber and cause the float 24 to rise. In its upward movement the top edge of the float will first engage the disc 29 to move the vacuum valve upwards until the valve comes under the influence of the flow entering the seat 26 so as thus to cause the vacuum to be cut off suddenly and with certainty. The pressure within the pump chamber will therefore immediately rise by reason of the admission of atmospheric air through the vent 32 allowing the gasolene within the pump chamber to flow out through the pipe 10 back into the main tank, and also through the pipe 11 into the auxiliary tank. In this way a portion of the gasolene drawn into the pump chamber at each up stroke of the float will be allowed to flow out of the same into the auxiliary tank. In practice the pump works quite rapidly making a number of strokes per minute, and soon the auxiliary tank will become filled. When this happens the only gasolene flowing from the pump chamber into the auxiliary tank will be that necessary to compensate for the gasolene removed therefrom by the action of the engine in the time between successive strokes. The whole device is very simple and effective in operation, and constitutes an attractive addition to the usual instrument board. The eye of the operator notes the up and down movements of the float 24 and by that fact is assured that the device is functioning properly and the gasolene is being supplied to the auxiliary tank. If the supply of gasolene becomes exhausted in the main tank more or less air will be drawn by the suction from the main tank and by bubbling through the gasolene in the gasolene in the pump chamber will advise the operator of the fact. The supply of gasolene in the auxiliary tank 5 will be sufficient to permit the car to run for a number of miles so as to permit the main tank to be replenished.

Having now described my invention, what I claim as new therein and desire to secure by Letters Patent is as follows:

In a vacuum pump for a vacuum feed system, the combination with a pump chamber, a float therein, a valve mechanism controlled by the float, of a vent in the upper wall of the pump chamber at all times communicating with the atmosphere, and a disc having a channel therein mounted upon the outer end of the pump chamber to protect said vent, substantially as set forth.

This specification signed and witnessed this 5th day of December, 1922.

THOMAS A. EDISON, Jr.